US00RE43706E

(19) United States
(12) Reissued Patent
Chen et al.

(10) Patent Number: US RE43,706 E
(45) Date of Reissued Patent: Oct. 2, 2012

(54) FALLBACK FUNCTION TELECOMMUNICATIONS DEVICE

(75) Inventors: Su-Yi Chen, Keelung (TW); Benson Chen, Taipei (TW)

(73) Assignee: Askey Computer Corporation, Taipei (TW)

(21) Appl. No.: 11/962,668

(22) Filed: Dec. 21, 2007

Related U.S. Patent Documents

Reissue of:
(64) Patent No.: 6,980,643
Issued: Dec. 27, 2005
Appl. No.: 09/986,333
Filed: Nov. 8, 2001

(51) Int. Cl.
*H04M 1/00* (2006.01)
*H04M 3/00* (2006.01)

(52) U.S. Cl. ... 379/377; 379/378; 379/382; 379/399.01; 370/352; 370/353; 370/354

(58) Field of Classification Search ..... 379/377, 379/378, 382, 399.01, 93.05, 93.09, 93.11; 370/352, 353, 354
See application file for complete search history.

(56) References Cited

U.S. PATENT DOCUMENTS 5,499,287 A * 3/1996 Beck et al. ..... 379/442
5,812,646 A * 9/1998 Kikuchi ..... 379/100.16
6,002,747 A * 12/1999 Eftechiou ..... 379/35
6,067,353 A * 5/2000 Szeliga ..... 379/93.35
6,377,668 B1 * 4/2002 Smock et al. ..... 379/142.08
6,542,499 B1 * 4/2003 Murphy et al. ..... 370/352
6,700,956 B2 * 3/2004 Chang et al. ..... 379/93.09
6,868,081 B1 * 3/2005 Akram et al. ..... 370/356
2002/0196777 A1 * 12/2002 Wu et al. ..... 370/352
2003/0026247 A1 * 2/2003 Bernstein ..... 370/352
2003/0083009 A1 * 5/2003 Freyman et al. ..... 455/26.1

* cited by examiner

*Primary Examiner* — Tuan A Pham
(74) *Attorney, Agent, or Firm* — Browdy and Neimark, PLLC

(57) ABSTRACT

The invention herein is fallback function communications device comprised of a microprocessor, utilized to perform a predetermined operation and processing of a predetermined input signal and then output a corresponding signal, as well as a minimum of one relay circuit having an amplifier circuit and a relay. The terminal at the first side of the relay is connected to the telephone line tip/ring terminal, while the terminal at the second side of the relay is connected to the Public Services Telephone Network (PSTN) tip/ring terminal of the microprocessor. An off-hook detection circuit is connected to the PSTN tip/ring terminal and also connected to the ring detection terminal of the said microprocessor. A dummy load circuit is connected to the tip terminal and the ring terminal of the PSTN. As such, in the event of Voice Over Internet Protocol (VOIP) system failure, the present invention is capable of automatically switching to the PSTN and thereby maintain telephone system operation.

6 Claims, 8 Drawing Sheets

FALLBACK FUNCTION TELECOMMUNICATIONS DEVICE

Matter enclosed in heavy brackets [ ] appears in the original patent but forms no part of this reissue specification; matter printed in italics indicates the additions made by reissue.

BACKGROUND OF THE INVENTION

1) Field of the Invention

The invention herein relates to a fallback function telecommunications device for Voice Over Internet Protocol (VOIP) systems, specifically one that effectively prevents VOIP system failure.

2) Description of the Prior Art

Plain old telephone service (POTS) communications is based on conventional Public Services Telephone Network (PSTN) technology. However, since PSTN is an analog telephone system that occupies a relatively large bandwidth, telecommunications services providers have developed Voice Over Internet Protocol (VOIP) technology wherein PSTN operation is performed through the VOIP system which occupies less bandwidth such that under the same bandwidth conditions, more simultaneous active telephone lines are accommodated. Due to the narrower bandwidth of VOIP systems, cost is reduced and consumer charges are subsequently lowered. As a result, more and more telecommunications services providers and consumers are utilizing VOIP telephones.

However, the VOIP systems installed by telecommunication services providers occasionally suffer VOIP system failure due to unforeseeable causes, resulting in telephone line disconnection that is a loss for both telecommunication services providers and consumers. At the same time, telecommunication services providers are faced with subscriber complaints and users frequently link via an outside line (i.e., PSTN) to prevent disconnection. As such, this increases cost and, furthermore, is quite convenient since users must switch lines manually.

SUMMARY OF THE INVENTION

The primary objective of the invention herein is to provide a fallback function telecommunications device that prevents Voice Over Internet Protocol (VOIP) failure.

To enable a further understanding of the structure, innovative features, and operation of the present invention, the brief description of the drawings below is followed by the detailed description of the invention herein.

DETAILED DESCRIPTION OF THE INVENTION

Figure 1:
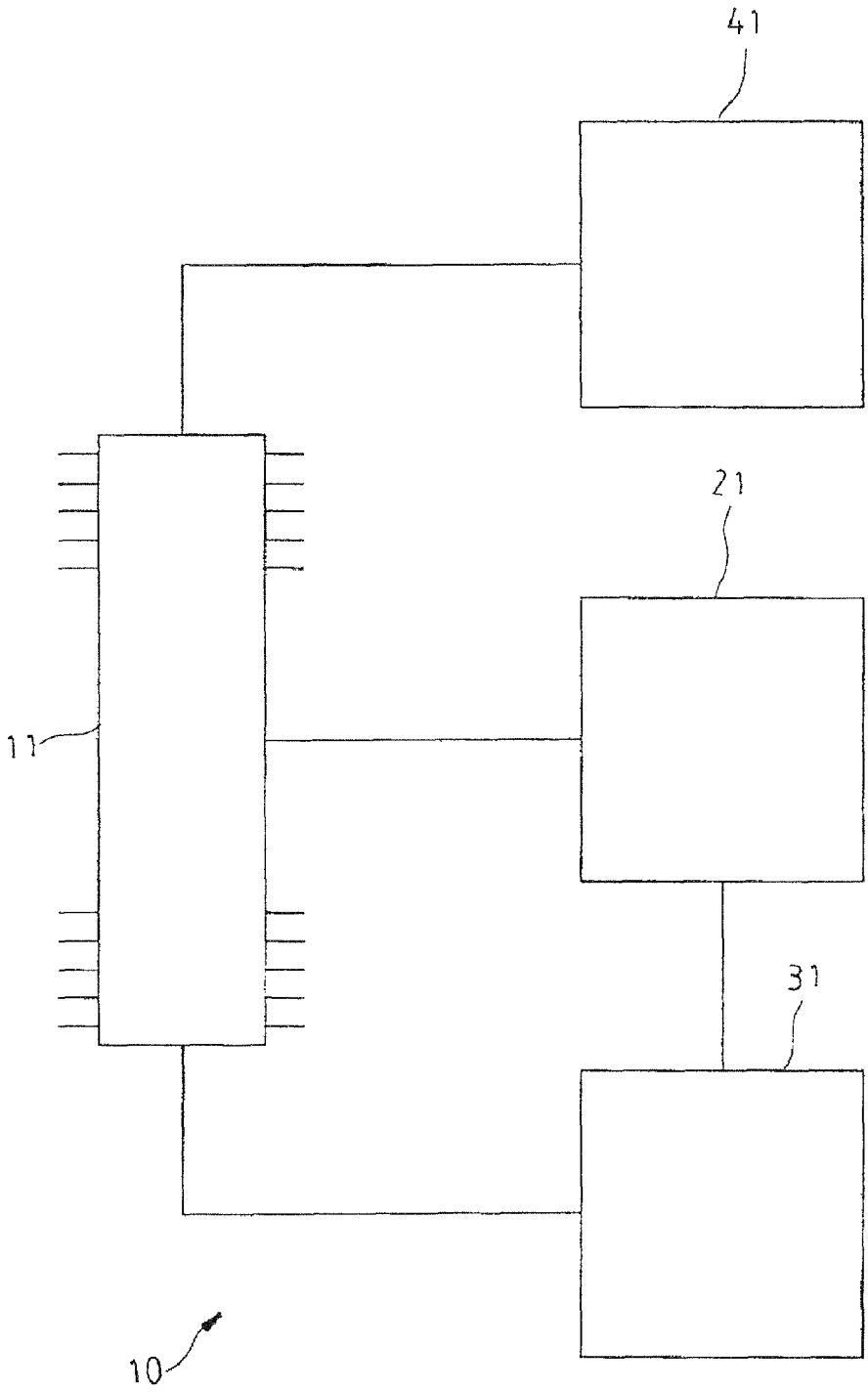
FIG. 1 is a block diagram of the most preferred circuit embodiment of the invention herein.

Referring to FIG. 1, FIG. 2, FIG. 3, FIG. 4, and FIG. 5, the most preferred embodiment of the invention herein provides a fallback function telecommunications device 10 comprised of a microprocessor 11, a relay circuit 21, an off-hook detection circuit 31, and a dummy load circuit 41, of which:

The said microprocessor 11 has processing operations capability and is utilized to process an input signal and afterwards output a corresponding signal.

Figure 2:
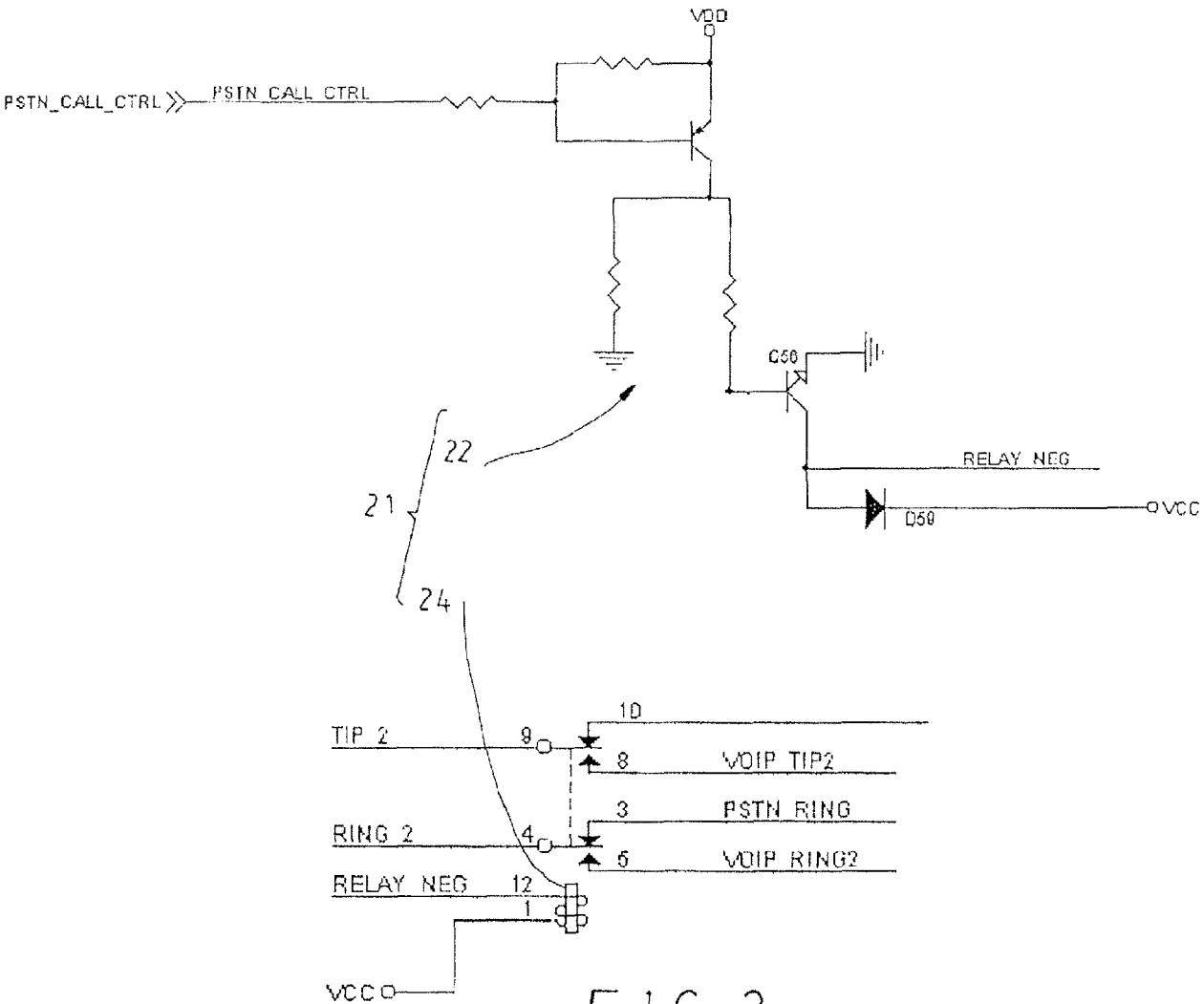
FIG. 2 is a partial schematic diagram of the most preferred embodiment of the invention herein illustrating the relay circuit.

The said relay circuit 21, as indicated in FIG. 2, has an amplifier circuit 22 and a relay 24; the input terminal of the said amplifier circuit 22 is connected to the said microprocessor 11 and its output terminal is connected to the signal input terminal of the said relay 24; the terminal at the first side of the said relay 24 is connected to the telephone line tip/ring terminal and the terminal at the second side of the said relay 24 is connected to the Public Services Telephone Network (PSTN) tip/ring terminal of the said microprocessor 11; as such, the telephone line tip/ring terminal is connected to the PSTN tip/ring terminal, but when the said relay 24 is controlled into operation, the connection is switched to the Voice Over Internet Protocol (VOIP) tip/ring terminal of the said microprocessor 11; in other words, the connection of the telephone line tip/ring terminal is switched to the VOIP tip/ring terminal of the said microprocessor 11.

Figure 3:
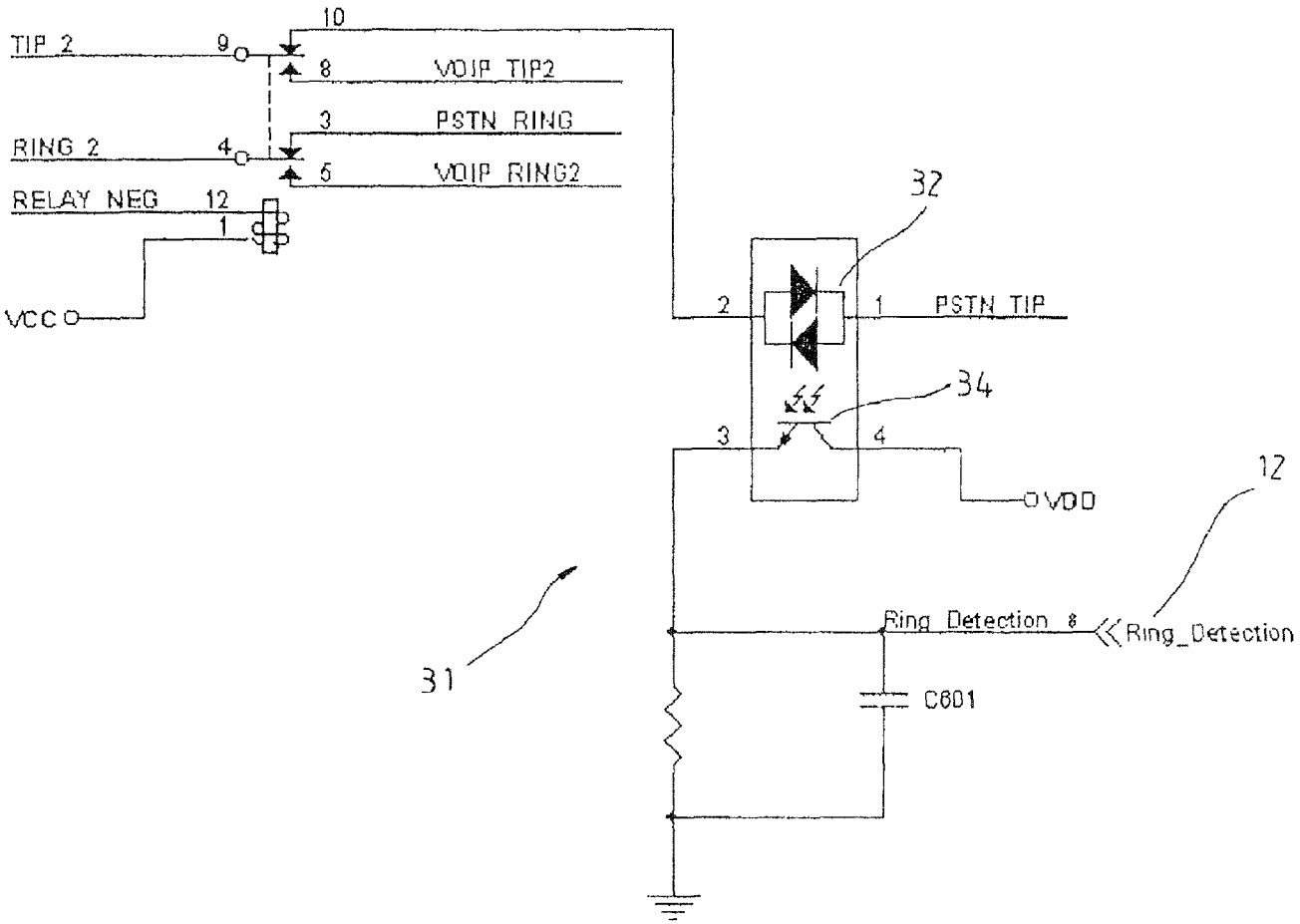
FIG. 3 is a partial schematic diagram of the most preferred embodiment or the invention herein illustrating the off-hook detection circuit.

The said off-honk detection circuit 31, as indicated in FIG. 3, consists of two light emitting diodes 32 in a positive-to-negative and negative-to-positive wiring arrangement and a phototransistor 34; one end of the said two light emitting diodes 32 is connected to the tip terminal of the said PSTN and the other end is connected to the shunt terminal of relay circuit 21 relay 24, while the said phototransistor 34 is connected to the ring detection terminal 12 of the said microprocessor 11; when the two light emitting diodes 32 are powered and generate light, the resulting operation of the phototransistor 34 changes the voltage at the ring detection terminal 12 to VDD, off-hook status is ascertained and, furthermore, a signal is sent to the said ring detection terminal 12.

Figure 4:
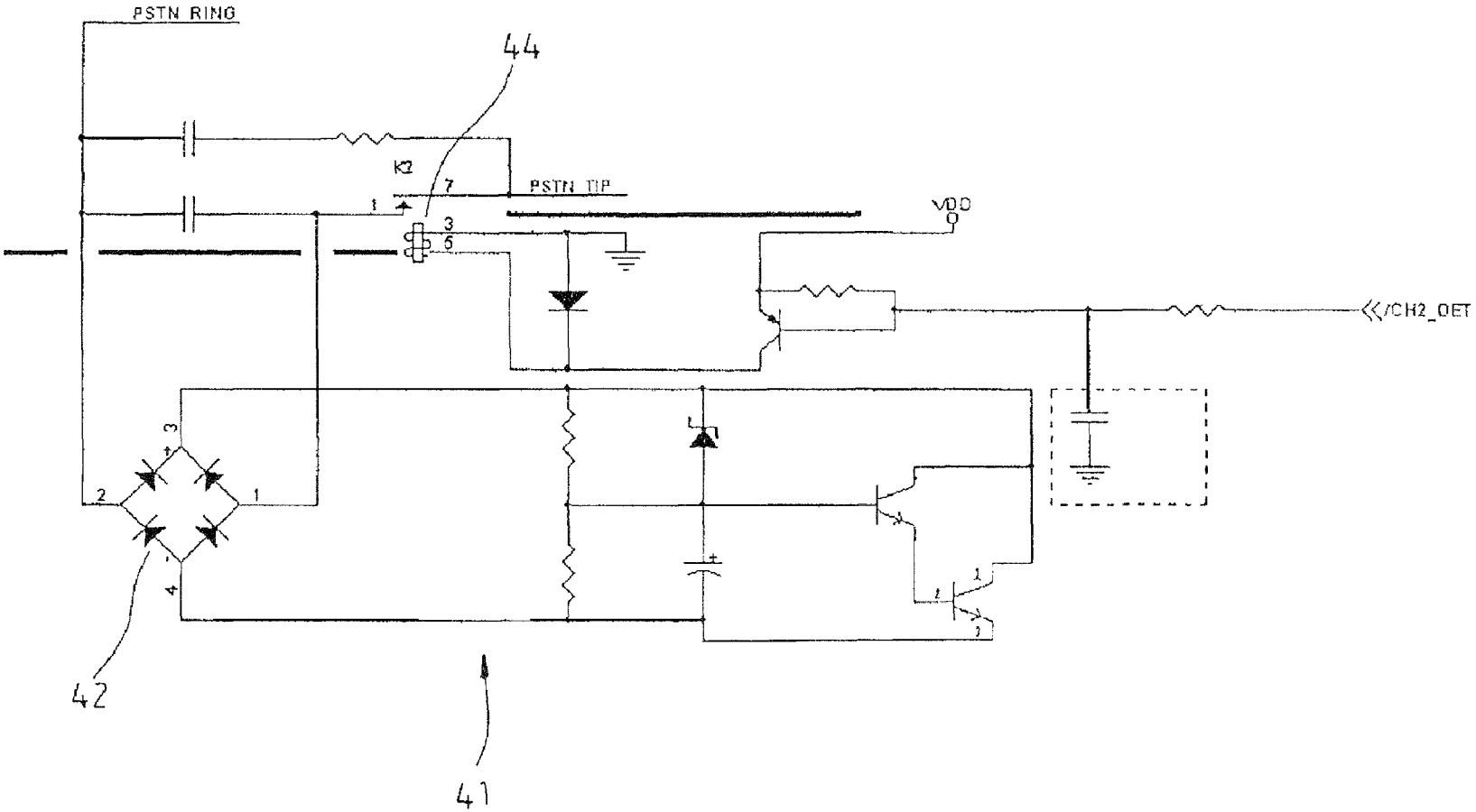
FIG. 4 is a partial schematic diagram of the most preferred embodiment of the invention herein illustrating the dummy load circuit.

The said dummy load circuit 41, as indicated in FIG. 4, consists of a full-wave bridge rectifier circuit 42 and a relay 44; one end of the said full-wave bridge rectifier circuit 42 is connected to the ring terminal of the said PSTN and its other end is connected to the shunt terminal at one side of the said relay 44; the shunt terminal at the other side of the said relay 44 is connected to the PSTN tip terminal and the signal input terminal of the said relay 44 is connected to the said microprocessor 11 which controls continuity between the said ring and tip terminals: as such, when the user is utilizing the VOIP system, the dummy load circuit 41 simulates a PSTN generated off-hook status, allowing the reception of busy signals by incoming telephone calls to the PSTN terminal in use.

Figure 5:
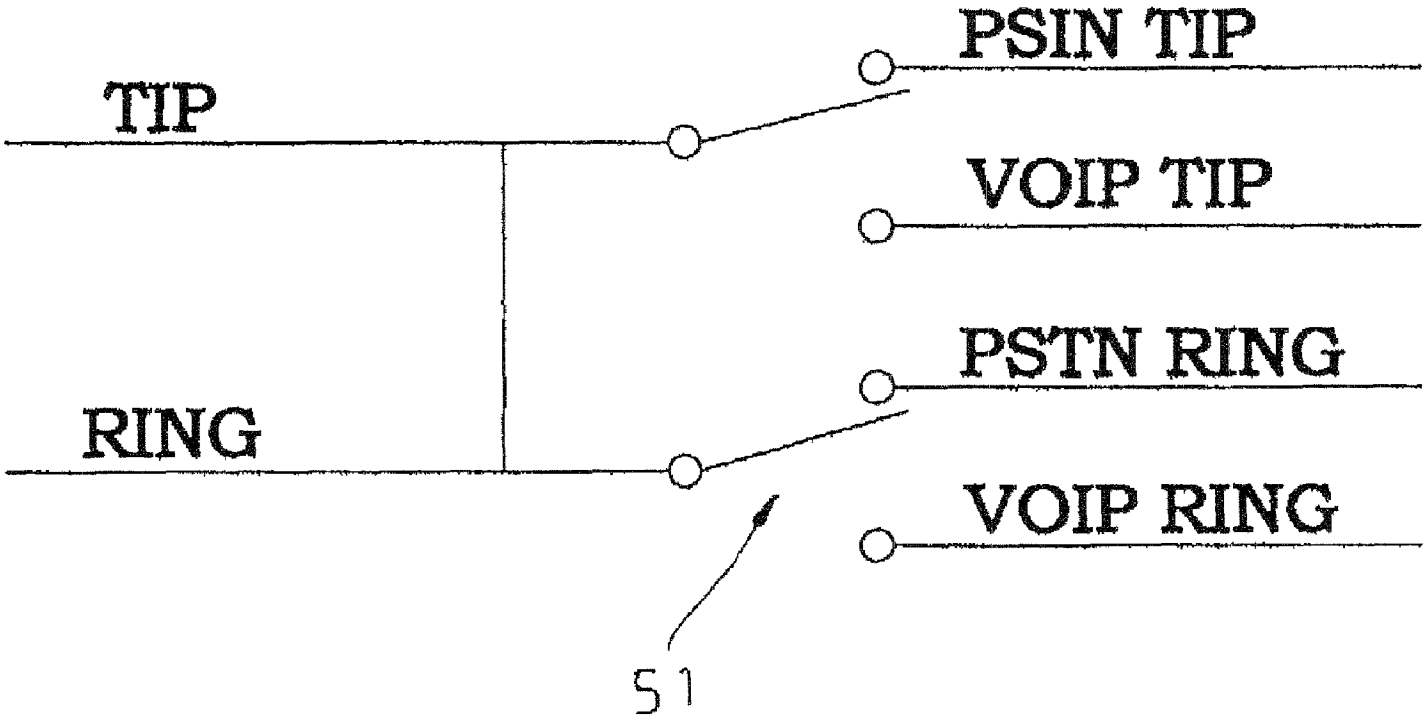
FIG. 5 is a partial schematic diagram of the most preferred embodiment of the invention herein detailing the circuit connections of the manual switch.

The invention herein is also comprised of:

A manual switch 51, the circuit connections of which are indicated in FIG. 5, that connects the telephone line circuit tip and ring terminals to the PSTN tip and ring terminals as well as the VOIP tip and ring terminals and which is utilized to provide the user optional manual toggling of the telephone line circuit connections between the PSTN terminals and the VOIP terminals.

Figure 6:
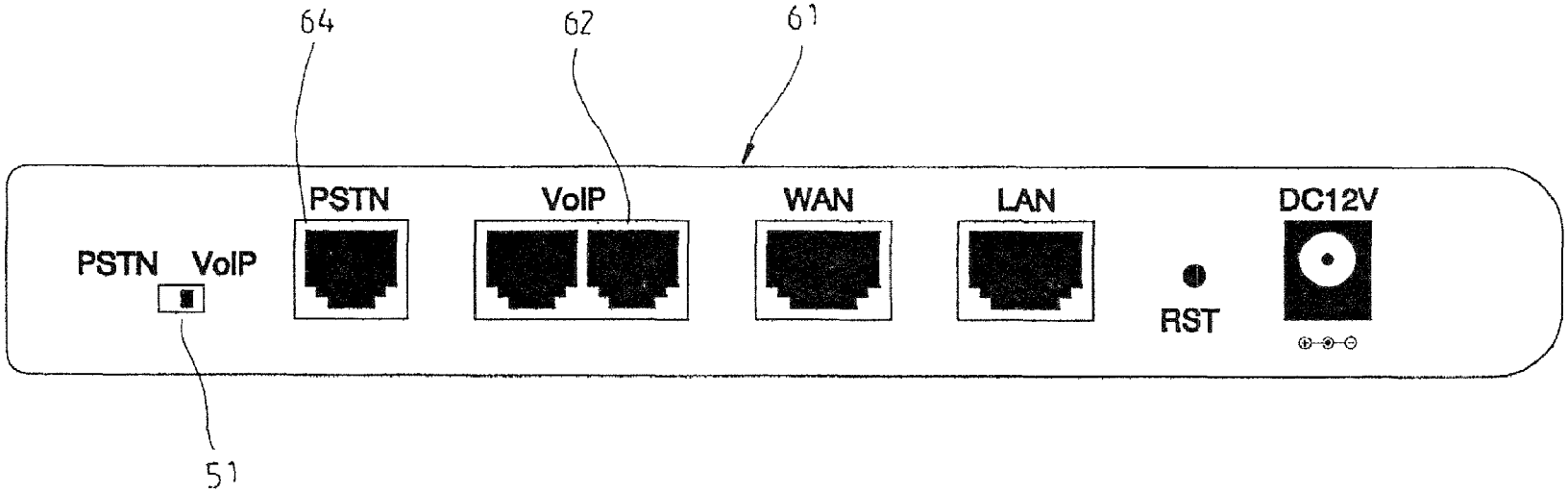
FIG. 6 is a drawing of the panel layout of the most preferred embodiment of the invention herein.
Figure 7:
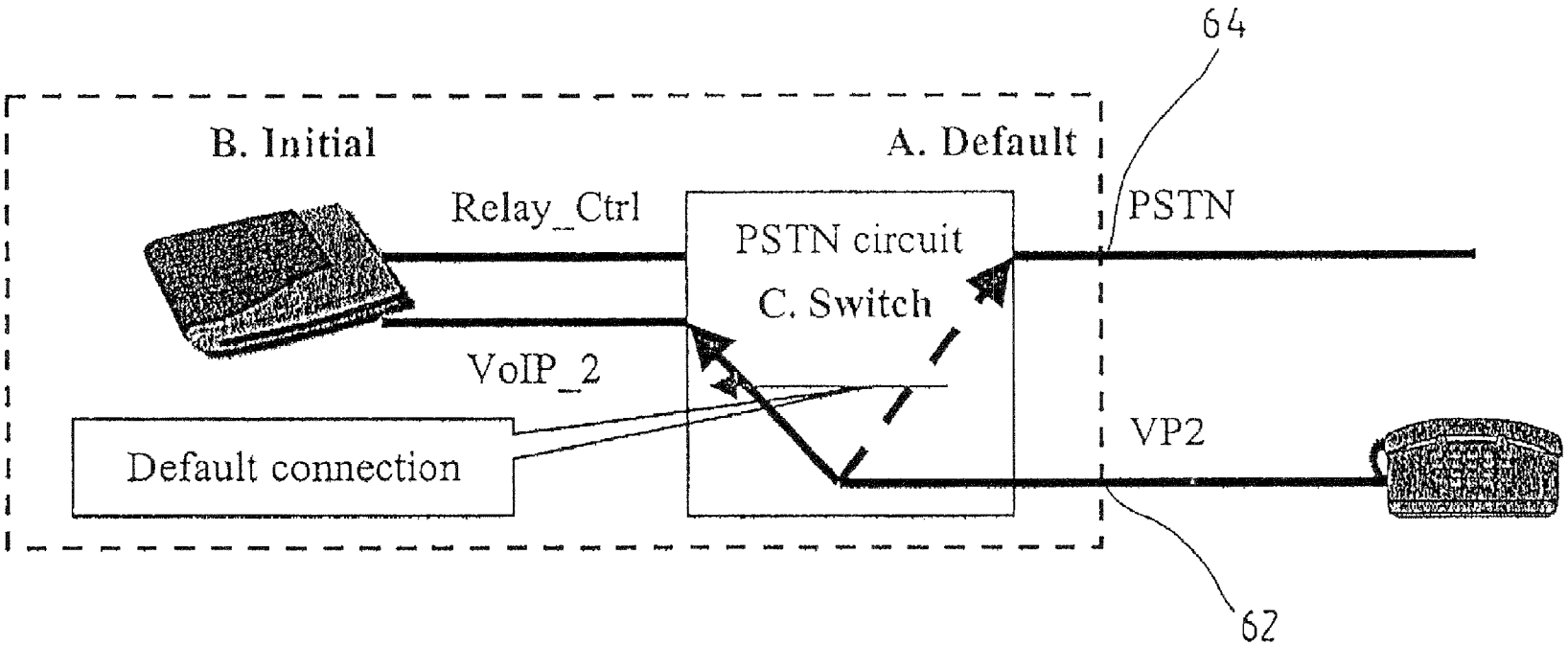
FIG. 7 is a drawing the most preferred embodiment of the invention herein in one operating mode.

Referring to FIG. 5, FIG. 6, and FIG. 7, when the invention herein is operated, the panel 61 shown in the drawings is utilized for configuration, wherein the said manual switch 51 is mounted on the panel 61, a telephone is connected to the second slot 62 (commonly referred to as VP2) of the VOIP system, the telephone line is connected to the slot 64 of the said PSTN, and the present invention is connected between the VP2 slot 62 and the PSTN slot 64; prior to initiating the operation of the invention herein and the prevailing condition is VP2 connected to PSTN, the user has conventional PSTN telephone operation; after the invention herein is initiated, the said relay circuit 21 switches the VP2 slot 62 into connection with the VOIP line (i.e., VOIP 2), at which time the user can utilize the VOIP system to effectively reduce telephone charges.

Figure 8:
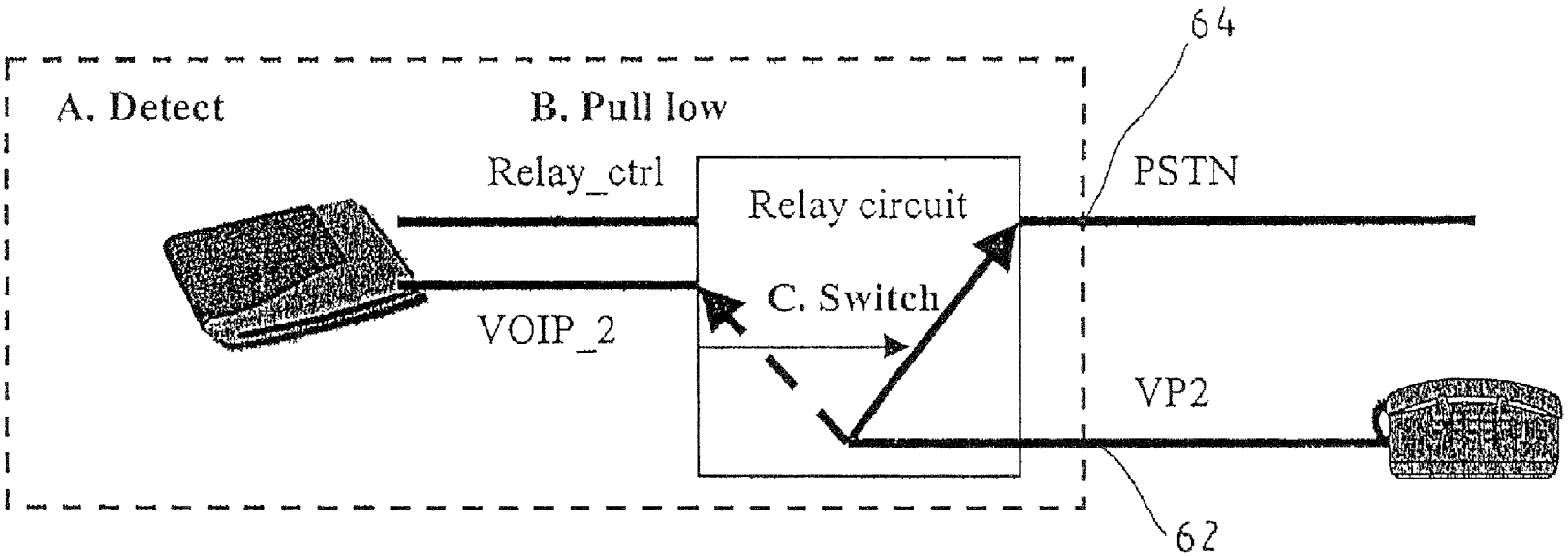
FIG. 8 is a drawing the most preferred embodiment of the invention herein in another operating mode.

As indicated in FIG. 8, when a VOIP system problem occurs, the said relay circuit 21 (as shown in FIG. 2) switches the said VP2 slot into connection with the PSTN, at which time the user can utilize the PSTN, with the switching thereof automatically executed so that no manual actuation by the user is required.

The said manual switch 51 of the present invention provides a means of forced switching between PSTN and VOIP system usage as required by the user.

The invention herein can be equipped with two or more relay circuits to accommodate multiple VOIP system telephone lines.

Given the said structure, the invention herein provides the following advantages:

1. Additional line installation is not required: Since the present invention is capable of switching in accord with VOIP system conditions, there is no need to install additional PSTN lines, which saves the expenses involved.

2. Automatic toggling: Manual switching of the invention herein is not required because it is capable of switching automatically in response to VOIP system conditions, which eliminates troublesome manual actuation.

What is claimed is:

1. A fallback telecommunications device comprising:

a microprocessor utilized to perform a predetermined operation and processing of a predetermined input signal and then output a corresponding signal;

at least one relay circuit having an amplifier circuit and a relay, an input terminal of said amplifier circuit being connected to said microprocessor and an output terminal of said amplifier circuit being connected to the signal input terminal of said relay; a terminal at a first side of said relay being connected to a telephone line tip/ring terminal and a terminal at a second side of said relay being connected to a Public Services Telephone Network (PSTN) tip and ring terminals of said microprocessor; wherein the telephone line tip and ring terminals is connected to the PSTN tip and ring terminals, wherein when the said relay is controlled into operation, the connection of the tip and ring terminals is switched to Voice Over Internet Protocol (VOIP) tip and ring terminals of said microprocessor;

an off-hook detection circuit connected to said PSTN tip and ring terminals and a ring detection terminal of said microprocessor that is utilized to ascertain telephone off-hook status and send a signal to said ring detection terminal; and a dummy load circuit connected to the tip terminal and the ring terminal of said PSTN for generating a simulated off-hook signals to transmit to said PSTN when the VOIP tip and ring terminals are in use, wherein said dummy load circuit consists of a full-wave bridge rectifier circuit and a relay; one end of said full-wave bridge rectifier circuit is connected to the ring terminal of said PSTN and another end of said full-wave bridge rectifier circuit is connected to a shunt terminal at one side of said relay, a shunt terminal at another side of said relay is connected to the PSTN tip terminal and the signal input terminal of said relay is connected to said microprocessor which controls continuity between said ring and tip terminals.

2. The fallback telecommunications device of claim 1, further comprising a manual switch that connects the telephone line circuit tip and ring terminals to the PSTN tip and ring terminals and the VOIP tip and ring terminals and which is utilized to provide a user optional manual toggling of telephone line circuit connections between the PSTN terminals and the VOIP terminals.

3. The fallback telecommunications device of claim 1, wherein said off-hook detection circuit consists of two light emitting diodes in a positive-to-negative and negative-to-positive wiring arrangement and a phototransistor.

*4. A fallback telecommunications device comprising:*

*a microprocessor utilized to perform a predetermined operation and processing of a predetermined input signal and then output a corresponding signal;*

*at least one relay circuit having an amplifier circuit and a relay, an input terminal of said amplifier circuit being connected to said microprocessor and an output terminal of said amplifier circuit being connected to the signal input terminal of said relay; a terminal at a first side of said relay being connected to telephone line tip and ring terminals, and a terminal at a second side of said relay being connected to Public Services Telephone Network (PSTN) tip and ring terminals of said microprocessor; wherein said telephone line tip and ring terminals is connected to the PSTN tip and ring terminals;*

*an off-hook detection circuit connected to said PSTN tip and ring terminals and a ring detection terminal of said microprocessor that is utilized to ascertain telephone off-hook status and send a signal to said ring detection terminal; and*

*a dummy load circuit connected to the tip terminal and the ring terminal of said PSTN for generating a simulated off-hook signal to transmit to said PSTN when Voice Over Internet Protocol (VOIP) tip and ring terminals of said microprocessor are in use, wherein said dummy load circuit comprises a rectifier circuit and a relay, and wherein said rectifier circuit is a full-wave bridge rectifier circuit; one end of said full-wave bridge rectifier circuit is connected to the ring terminal of said PSTN and another end of said full-wave bridge rectifier circuit is connected to a shunt terminal at one side of said relay, a shunt terminal at another side of said relay is connected to the PSTN tip terminal and the signal input terminal of said relay is connected to said microprocessor which controls continuity between said ring and tip terminals.*

*5. The fallback telecommunications device of claim 4, further comprising a manual switch that connects the telephone line circuit tip and ring terminals to the PSTN tip and ring terminals and the VOIP tip and ring terminals and which is utilized to provide a user optional manual toggling of telephone line circuit connections between the PSTN terminals and the VOIP terminals.*

*6. The fallback telecommunications device of claim 4, wherein said off-hook detection circuit consists of two light emitting diodes in a positive-to-negative and negative-to-positive wiring arrangement and a phototransistor.*

* * * * *